(12) United States Patent
Barbera et al.

(10) Patent No.: US 12,234,913 B2
(45) Date of Patent: Feb. 25, 2025

(54) SEALING ASSEMBLY FOR BEARINGS, IN PARTICULAR FOR USE IN AGRICULTURE

(71) Applicant: AKTIEBOLAGET SKF, Gothenburg (SE)

(72) Inventors: Stellario Barbera, Turin (IT); Giorgia D'Amico, Turin (IT); Claudio Foti, Villanova d'asti (IT)

(73) Assignee: AKTIEBOLAGET SKF (SE)

(*) Notice: Subject to any disclaimer, the term of this patent is extended or adjusted under 35 U.S.C. 154(b) by 0 days.

(21) Appl. No.: 18/370,972

(22) Filed: Sep. 21, 2023

(65) Prior Publication Data

US 2024/0011563 A1    Jan. 11, 2024

Related U.S. Application Data

(63) Continuation of application No. 17/750,764, filed on May 23, 2022, now Pat. No. 11,808,356.

(30) Foreign Application Priority Data

May 31, 2021   (IT) .................. 102021000014132

(51) Int. Cl.
   *F16J 15/3256*  (2016.01)
   *F16J 15/3232*  (2016.01)
   *F16J 15/447*   (2006.01)

(52) U.S. Cl.
   CPC ....... *F16J 15/3256* (2013.01); *F16J 15/3232* (2013.01); *F16J 15/4474* (2013.01)

(58) Field of Classification Search
   CPC .... F16J 15/002; F16J 15/3232; F16J 15/3256; F16J 15/348; F16J 15/4472; F16J 15/4474; F16C 33/7823; F16C 33/7886; F16C 33/7889; F16C 33/7896; F16C 33/805
   See application file for complete search history.

(56) References Cited

U.S. PATENT DOCUMENTS

| | | | |
|---|---|---|---|
| 6,450,503 B1 | 9/2002 | Dossena et al. | |
| 7,658,386 B2* | 2/2010 | Oldenburg | F16J 15/3256 277/572 |
| 8,328,428 B2 | 12/2012 | Andersson et al. | |
| 9,651,155 B2 | 5/2017 | Angiulli et al. | |

(Continued)

FOREIGN PATENT DOCUMENTS

| | | |
|---|---|---|
| CN | 205013509 | 2/2016 |
| EP | 2088846 | 8/2009 |
| EP | 3078887 | 10/2016 |

OTHER PUBLICATIONS

Search Report for corresponding Italy Patent Application No. 2021000014132 dated Jan. 25, 2022.

(Continued)

*Primary Examiner* — Nicholas L Foster
(74) *Attorney, Agent, or Firm* — Reed Smith LLP

(57) ABSTRACT

A sealing assembly for bearings, in particular for use in agriculture, comprising a primary sealing barrier and a secondary sealing barrier, which are arranged in series along a potential path (P) of ingress of contaminants into the bearing, and have, respectively, a first seal and a second seal with a plurality of contact lips. The contact lips of the first and second seal with a plurality of contact lips may be static lips that do not rotate about an axis (A) of rotation of the bearing.

10 Claims, 1 Drawing Sheet

(56) References Cited

U.S. PATENT DOCUMENTS

| | | | |
|---|---|---|---|
| 9,995,396 B1* | 6/2018 | Maskaliunas | F16J 15/3268 |
| 10,240,677 B2 | 3/2019 | Angiulli et al. | |
| 10,948,017 B2 | 3/2021 | Kanzaki | |
| 11,808,356 B2* | 11/2023 | Barbera | F16C 33/80 |
| 2002/0011710 A1* | 1/2002 | Oldenburg | F16J 15/3256 |
| | | | 277/612 |
| 2009/0257698 A1 | 10/2009 | Aritake et al. | |
| 2010/0025057 A1 | 2/2010 | Andersson et al. | |
| 2016/0031261 A1 | 2/2016 | Ciulla et al. | |
| 2016/0298769 A1 | 10/2016 | Angiulli et al. | |
| 2016/0298771 A1 | 10/2016 | Angiulli et al. | |
| 2020/0072284 A1 | 3/2020 | Kanzaki | |
| 2022/0381294 A1 | 12/2022 | Cognolato et al. | |
| 2022/0381348 A1* | 12/2022 | Barbera | F16C 33/7886 |

OTHER PUBLICATIONS

Search Report for corresponding European Patent Application No. 22174154 dated Sep. 30, 2022.
U.S. Appl. No. 17/750,764.

* cited by examiner

SEALING ASSEMBLY FOR BEARINGS, IN PARTICULAR FOR USE IN AGRICULTURE

CROSS-REFERENCE TO RELATED APPLICATIONS

This application is a continuation of U.S. patent application Ser. No. 17/750,764 filed on May 23, 2022, which is based on and claims priority to Italian Patent Application No. 102021000014132 filed on May 31, 2021, under 35 U.S.C. § 119, the disclosure of which is incorporated by reference herein.

FIELD

The present disclosure relates to a sealing assembly for bearings, in particular for use in agriculture.

BACKGROUND

CN205013509U describes a sealing assembly for bearings which, although not explicitly intended for use in agriculture, is nonetheless able to withstand challenging environments, exactly like those encountered when working the land in agriculture, and which comprises a primary sealing barrier and a secondary sealing barrier.

BRIEF DESCRIPTION OF THE DRAWINGS

The disclosure will now be described with reference to the attached drawing, which illustrates non-limiting exemplary embodiments of the disclosure, in which.

DETAILED DESCRIPTION

Figure 1:
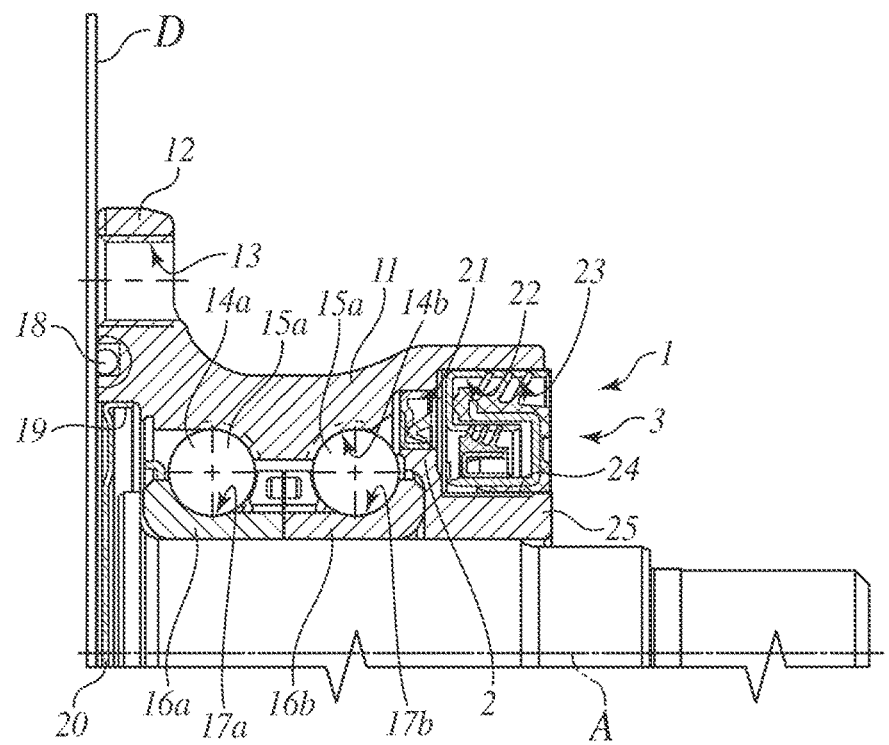
FIG. 1 is an axial cross-sectional view of a sealing assembly for bearings, in particular for use in agriculture, according to exemplary embodiments of the present disclosure.

A primary sealing barrier is supported by the inner ring of the bearing and comprises a first laminar shield which extends from an outer surface of the inner ring to an inner surface of the outer ring; and a secondary sealing barrier is supported by the outer ring and comprises a second laminar shield which extends from an inner surface of the outer ring to the outer surface of the inner ring: the first and the second shields have respective cylindrical mounting bodies fitted on the outer surface of the inner ring and on the inner surface of the outer ring, respectively, and respective cylindrical support bodies, which are connected to the relative cylindrical mounting bodies by respective annular flanged bodies: each cylindrical support body of each shield is radially inserted between the cylindrical mounting body and the cylindrical support body of the other shield.

The primary sealing barrier further comprises a first seal with a plurality of lips, which is supported by the relative cylindrical support body, and is provided with three lips in contact with a friction surface of the cylindrical mounting body of the secondary sealing barrier; and, likewise, the secondary sealing barrier also further comprises a second seal with a plurality of lips, which is supported by the relative cylindrical support body, and is provided with three lips in contact with a friction surface of the cylindrical mounting body of the primary sealing barrier.

Since the sealing device is mounted inside the bearing between the inner ring and the outer ring, there is a potential path for the ingress of contaminants into the bearing, and the three sealing lips of the primary sealing barrier are arranged along this path upstream of the three sealing lips of the secondary sealing barrier, making this path somewhat twisted and difficult for any contaminants to pass through completely.

In the sealing assembly described above, the sealing lips of the two sealing barriers have respective constant radial lengths and, during assembly of the sealing assembly, as they come into contact with the related friction surfaces, they bend substantially in the same way, creating ostensibly optimal conditions of contact in terms of pressure and sealing. However, in use, because of both the stresses to which the relative bearings are subjected and the type of contaminants to which they are exposed, they may wear out very quickly, the sealing assembly itself thus losing its sealing capacity.

Moreover, again in the sealing assembly described above, while the primary sealing barrier is connected to the inner ring, which is a fixed ring of the bearing, the secondary sealing barrier is connected to the outer ring which, conversely, is a rotating ring of the bearing, and therefore while the three contact lips of the first seal with a plurality of lips are static non-rotating lips, the three contact lips of the second seal with a plurality of lips are, conversely, dynamic rotating lips and it is necessary to make different structural arrangements for the first and second seal with a plurality of lips since one of the two is subjected to centrifugal forces which, in use, result in substantial variability of sealing conditions.

The present disclosure relates to a sealing assembly for bearings, in particular for use in agriculture, that can overcome one or more of the disadvantages found in the prior art. In particular, one major aim of the disclosure is to improve the efficiency of the seal without increasing friction, for any type of bearing system that requires a high degree of reliability, including under extremely contaminating conditions and, moreover, where there is some potential for misalignment between the rings of the bearing.

Referring to FIG. 1, the reference sign 1 generally designates exemplary embodiments of a sealing assembly for a bearing unit 10, in particular for a bearing unit for use in agriculture.

The bearing unit 10 may include a flanged outer ring 11; a radial flange 12 rigidly secured to the flanged outer ring 11 for mounting a disc D by means of bolts (not shown) mounted in a series of axial holes 13; two raceways 14a, 14b formed on the inside of the flanged outer ring 11 for housing respective rows of rolling bodies 15a, 15b; and for each raceway 14a, 14b, a respective inner ring 16a, 16b axially adjacent to the other inner ring 16b, 16a and both mounted on a central support shaft A. The flanged outer ring 11 may be stationary and the inner ring 16a, 16b may be rotatable with central support shaft A, for example.

The rings 16a, 16b may be provided with respective raceways, two raceways 17a, 17b, for housing the rows of rolling bodies 15a, 15b.

On the side facing the disc D, the bearing unit 10 may include an O-ring seal 18 housed in a circular groove 19 and pressed between the outer ring 11 and the disc D so as to ensure sealing against contaminants that could get into internal parts of the bearing unit 10, and a cover 20, radially inside the circular groove 19 for closing off the outer ring 11 on the same side as the disc D.

On the side opposite that facing the disc D, the bearing unit 10 may include two cylindrical seats 21 and 22, which are also formed in the flanged outer ring 11, and are arranged in series with one another. The seat 22 is radially delimited on the outside by an internal cylindrical surface 23 of the outer ring 11 and is radially delimited on the inside, in the exemplary embodiment shown, by an outer cylindrical surface 24 of an intermediate support ring 25 arranged axially adjacent to the inner ring 16b and substantially forming part of the inner ring 16b.

According to various embodiments of the present disclosure, the sealing assembly 1 may include a cassette seal 2 inserted in the cylindrical seat 21, i.e. in the seat 21 closest to the inside of the bearing unit 10, and a sealing device 3, which is arranged in the cylindrical seat 22, i.e. in the axially outermost seat 22 of the bearing unit 10, and has the function of preventing the ingress of contaminants resulting from the agricultural labor of working the land, certainly into the bearing unit 10 but above all into the cassette seal 2, which will therefore have a longer service life, enhancing the service life of the bearing unit 10. According to various embodiments of the present disclosure, the sealing device 3 is mounted at the intermediate support ring 25, which, as described above, is arranged axially adjacent to the inner ring 16b and substantially forms part of the inner ring 16b: alternatively, and with no substantial change to the subject matter for which protection is sought, the sealing device 3 may be mounted directly at the inner ring 16b, the surface 24 of which may be axially elongated so as to delimit radially on the inside both the seats 21 and 22. The explanation below will refer explicitly to the mounting of the sealing device 3 at the intermediate support ring 25 but, as just pointed out, it may encompass, without any limitation whatsoever, the mounting of the sealing device 3 at the inner ring 16b.

Figure 2:
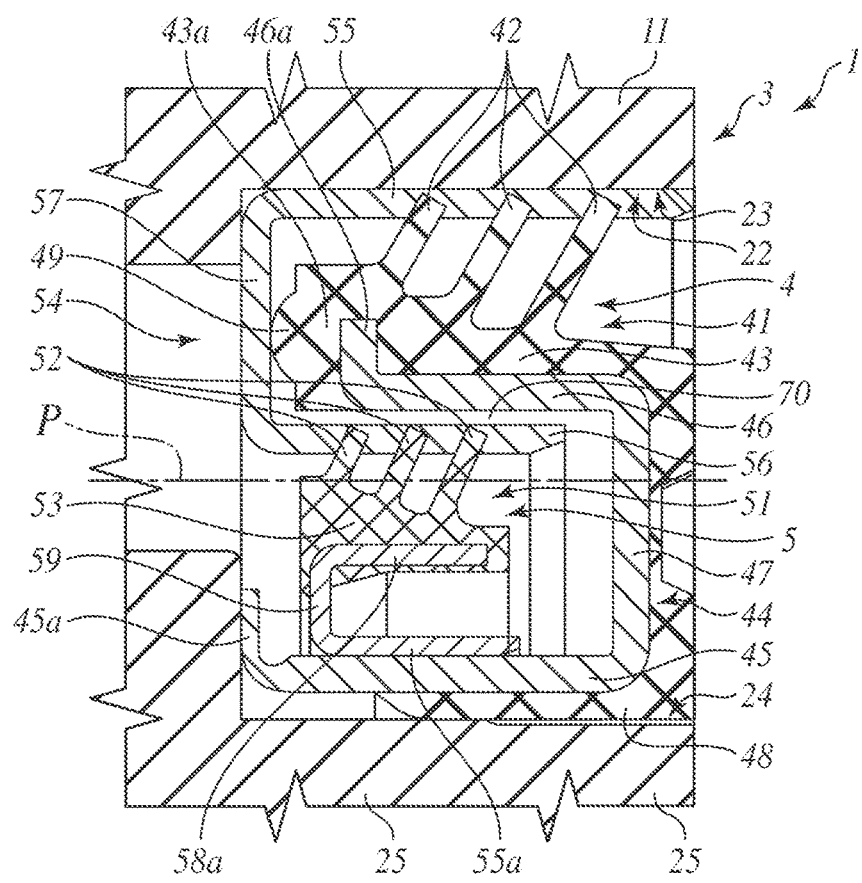
FIG. 2 is an enlarged view of the sealing assembly of the bearing of FIG. 1.

As shown more clearly in FIG. 2, the sealing device 3 may include a primary sealing barrier 4 and a secondary sealing barrier 5, which are arranged in series along a potential path P of ingress of contaminants into the bearing unit 10, and may include a first seal 41 with a plurality of contact lips and, respectively, a second seal 51 with a plurality of contact lips. The contact lips 42 and 52 of the first and second seal 41 and 51 are static contact lips 42 and 52 that do not rotate about the central axis A, i.e. about the axis of rotation of the bearing unit 10.

Both the first seal 41 and the second seal 51 have the same number of contact lips 42 and 52: in particular, in the embodiment of the present disclosure shown in FIGS. 1 and 2, there are three contact lips 42 and 52, but depending on the use to which the bearing unit 10 is put, two contact lips may be sufficient for less demanding uses, or more than three, and up to five or six contact lips may be required for more demanding uses, possibly when working on land with a greater degree of contaminants.

In any case, the explanation below refers to the case in which there are three contact lips 42 and 52 in which, moreover, the contact lips 42 and 52 of the first and second seal 41 and 51 may have radial dimensions decreasing along the ingress path and are inclined, when in a free configuration prior to assembly, with respect to the axis of rotation of the bearing unit 10 with the same inclination and so as to be convergent towards the inside of the bearing unit 10.

The contact lips 42 of the first seal 41 with a plurality of contact lips 52 of the second seal 42 with a plurality of contact lips may be made of polymer material, start from respective bases 43 and 53 made of the same material, and the gradual reduction in radial height of the contact lips 42 and 52 is obtained by means of a gradual axial increase in a radial thickness of the relative base 43 and 53. The possibility of having contact lips 42 and 52 of different radial heights, in which the contact lips 42 and 52 of greater radial height are those further upstream along the path P, first of all makes it possible to better control the final position, in use, of said contact lips 42 and 52, which will not touch one another, thus making it possible to expel contaminants more effectively. In particular, the contact lips 42 and 52 of greater radial height will also be more flexible than the contact lips 42 and 52 of lesser radial height, allowing both the first seal 41 and the second seal 51 to adapt easily to possible misalignments of the components of the bearing unit 10 or of the sealing assembly 1 resulting from particularly harsh and difficult conditions of use of the bearing unit 10, while the lesser flexibility, or increased rigidity, of the contact lips 42 and 52 of lesser radial height will give the latter greater frictional contact force, ensuring further and better sealing against the ingress of any contaminants along the ingress path P.

At the same time, having contact lips 42 and 52 all with the same inclination, in their free configuration prior to assembly, makes inversion of the contact lips 42 and 52 especially difficult, if not entirely unlikely, both during assembly of the sealing assembly 1, and when the bearing unit 10, and, therefore, the sealing assembly 1 are used in conditions in which the thrust of contaminants along the path P is particularly strong, for example when ploughing agricultural land and/or during pressure washing of the equipment. Having contact lips 42 and 52 all with the same inclination, in their free configuration prior to assembly, also considerably simplifies production, with the consequent advantages in terms of cost and quality, since the contact lips 42 and 52 can not only be removed from the production mold very easily, but without compromising their integrity even slightly.

As will be explained in more detail below, another feature of the sealing assembly 1 of the present disclosure is that the contact lips 42 and 52 are static lips, in other words they do not rotate about the central axis A, and therefore they are not subject to centrifugal forces which, in use, would give rise to substantial changes in sealing conditions. Moreover, because the contact lips 42 of the first seal 41 and the contact lips 52 of the second seal 42 are both static, their structural and design specifications will be substantially similar, affording further savings not only in terms of final cost price but also as regards production times, especially when it is necessary to change the proportions of the product to adapt it to bearing units 10 of different dimensions.

According to various embodiments of the present disclosure, the primary sealing barrier 4 is supported by the intermediate support ring 25, i.e. by the inner ring 16b of the bearing unit 10, and may include a first shield 44, which extends from the outer surface 24 to the inner surface 23 of the outer ring 11, and in turn may include a first cylindrical mounting body 45 fitted on the outer surface 24 of the intermediate support ring 25, i.e. of the inner ring 16b, and a first cylindrical support body 46 connected to the relative first cylindrical mounting body 45 by means of a respective annular flanged body 47. The first seal 41 may also include, in addition to the contact lips 41 and the related base 43, a cylindrical covering 48 made of polymer material, directly connected to the first cylindrical mounting body 45 and inserted between the first cylindrical mounting body 45 and the outer surface 24 so as to enhance both the sealing of the sealing device 3 and the grip of the first shield 44, i.e. of the first cylindrical mounting body 45, on the outer surface 24 of the intermediate support ring 25. Moreover, the base 43 may be directly connected to the first cylindrical support body 46, which therefore supports the contact lips 41.

The secondary sealing barrier 5 may, on the other hand, be connected to the outer ring 11 of the bearing unit 10, i.e. it is not entirely rigidly secured to the outer ring 11 from the angular point of view, and may include a second shield 54, which extends from the inner surface 23 of the outer ring 11 to the outer surface 24 of the intermediate support ring 25, i.e. of the inner ring 16b, and in turn may include a second cylindrical mounting body 55 fitted on the inner surface 23 of the outer ring 11, and a cylindrical friction body 56 connected to the relative second cylindrical mounting body 55 by means of a respective annular flanged body 57, which has a radial length such that it supports the cylindrical friction body 56 in substantial proximity to the cylindrical support body 46 of the primary sealing barrier 4. In particular, the cylindrical friction body 56 may be arranged coaxially to the axis A and to the cylindrical support body 46 and at a radial distance from the cylindrical support body 46 so as to form, with the cylindrical support body 46, a cylindrical passage, or, better still, a labyrinth seal 70 extending along the ingress path P. Since the cylindrical support body 46 may have an end bent portion 46a, which is inserted radially in the base 43 so as to support said base 43, the first seal 41 with a plurality of contact lips may include a projecting end portion 43a, which may project axially from the base 43 beyond the bent portion 46a substantially adjacent to the flanged body 57, and has an annular profile 49, of semi-circular section, which may extend from the projecting end portion 43a and may be in frictional contact with the flanged body 57 both to determine a reciprocal axial position of mounting of the primary sealing barrier 4 and secondary sealing barrier 5, and to create a further seal along the path P.

The annular profile 49 and the projecting end portion 43a are made of the same material as the contact lips 42, and the projecting end portion 43a is arranged radially and directly facing the cylindrical support body 46 helping to define part of the labyrinth seal 70.

As stated above, the secondary sealing barrier 5 is not entirely rigidly secured to the outer ring 11 from the angular point of view, and in fact the second shield 54 comprises a further second cylindrical mounting body 55a and a second cylindrical support body 58, which are connected to one another by means of a further annular flanged body 59, but are entirely independent of the second cylindrical mounting body 55 and of the cylindrical friction body 56. In particular, the further second cylindrical mounting body 55a is mounted on the first cylindrical mounting body 45 of the primary sealing barrier 4, and the contact lips 52 of the second seal 51 with a plurality of contact lips are supported by the second cylindrical support body 58, by insertion in the base 53, in frictional contact with the cylindrical friction body 56 on the side opposite the cylindrical friction body 56 with respect to the labyrinth seal 70.

Because the secondary sealing barrier 5 may not be entirely rigidly secured to the outer ring 11 from the angular point of view, or the second shield 54 may be split into two independent cylindrical mounting bodies 55 and 55a, makes it possible to both simplify production and simplify mounting of the contact lips 52 of the second seal 51 with a plurality of contact lips. To be specific, the second seal 51 may be rigidly secured to the assembly made up of the further second cylindrical mounting body 55a, second cylindrical support body 58, and further flanged body 59, and these elements may be both produced independently from the rest of the sealing assembly 1 and, therefore, mounted on the first cylindrical mounting body 45 thereby rigidly securing to one another, from the static as well as functional point of view, the contact lips 52 of the second seal 51 and the contact lips 42 of the first seal 41. Lastly, once the above-mentioned elements have been mounted on the first cylindrical mounting body 45, the latter may be bent radially outwards at a free end thereof to create an end bent portion 45a, which may be arranged axially facing the further annular flanged body 59, preventing it from becoming detached accidentally.

In addition to the various embodiments of the disclosure as described above, note that it encompasses many other variants. Moreover, note also that these embodiments are merely examples and do not limit the scope of the disclosure, or its uses, or its possible configurations. On the contrary, while the above description will allow a person skilled in the art to implement the present disclosure at least according to one exemplary embodiment thereof, note that many variants of the components described are possible without departing from the scope of the disclosure, as defined in the attached claims, which are interpreted literally and/or according to their legal equivalents.

We claim:

1. A sealing assembly for a bearing unit comprising an outer ring and an inner ring; the sealing assembly comprising:
    a primary sealing barrier; and
    a secondary sealing barrier,
    wherein:
        the primary sealing barrier and the secondary sealing barrier are arranged in series along a potential path (P) of ingress of contaminants into the bearing,
        the primary sealing barrier and the secondary sealing barrier comprise, respectively, a first seal and a second seal each with a plurality of contact lips,
        the contact lips of the first seal and the second seal are configured to be disposed radially between the outer ring and the inner ring of the bearing unit,
        at least one of the contact lips of the first seal axially overlaps at least one of the contact lips of the second seal,
        the contact lips of the first seal and the second seal are substantially inclined and have substantially the same inclination with respect to the axis (A) of rotation of the bearing unit,
        the contact lips of the first seal and the second seal are static lips that do not rotate about an axis (A) of rotation of the bearing unit, and
        the contact lips of the first seal and the second seal comprise radial dimensions decreasing along the potential ingress path (P).

2. The sealing assembly of claim 1, wherein,
    the primary sealing barrier comprises a first shield, the primary sealing barrier is configured to be supported by the inner ring of the bearing unit,
    the first shield is configured to extend from an outer surface of the inner ring to an inner surface of the outer ring,
    the first shield comprises a first cylindrical mounting body configured to be fitted on the outer surface of the inner ring, and a first cylindrical support body connected to the first cylindrical mounting body, and
    the contact lips of the first seal being supported by the first cylindrical support body.

3. A sealing assembly for a bearing unit comprising an outer ring and an inner ring; the sealing assembly comprising:
- a primary sealing barrier comprising a first shield; and
- a secondary sealing barrier, wherein:
- the primary sealing barrier and the secondary sealing barrier are arranged in series along a potential path (P) of ingress of contaminants into the bearing,
- the primary sealing barrier and the secondary sealing barrier further comprise, respectively, a first seal and a second seal each with a plurality of contact lips,
- the contact lips of the first seal and the second seal are configured to be disposed radially between the outer ring and the inner ring of the bearing unit,
- at least one of the contact lips of the first seal axially overlaps at least one of the contact lips of the second seal,
- the secondary sealing barrier comprises a second shield, the secondary sealing barrier is connected to the outer ring of the bearing unit,
- the second shield is configured to extend from the inner surface of the outer ring to the outer surface of the inner ring,
- the second shield comprises a cylindrical mounting body configured to be fitted on the inner surface of the outer ring, and a cylindrical friction body connected to the cylindrical mounting body by an annular flanged body, and
- the contact lips of the second seal being in frictional contact with the cylindrical friction body.

4. The sealing assembly of claim 2, wherein,
- the secondary sealing barrier comprises a second shield, the secondary sealing barrier is connected to the outer ring of the bearing unit,
- the second shield is configured to extend from the inner surface of the outer ring to the outer surface of the inner ring,
- the second shield comprises a second cylindrical mounting body configured to be fitted on the inner surface of the outer ring, and a cylindrical friction body connected to the second cylindrical mounting body by an annular flanged body, and
- the contact lips of the second seal being in frictional contact with the cylindrical friction body.

5. The sealing assembly of claim 3, wherein,
- the second shield of the secondary sealing barrier comprises a further second cylindrical mounting body and a second cylindrical support body which are connected to one another and independent of the second cylindrical mounting body and of the cylindrical friction body,
- the further second cylindrical mounting body is mounted on the first cylindrical mounting body of the primary sealing barrier, and
- the contact lips of the second seal being supported by the second cylindrical support body in frictional contact with the cylindrical friction body.

6. The sealing assembly of claim 4, wherein,
- the second shield of the secondary sealing barrier comprises a further second cylindrical mounting body and a second cylindrical support body which are connected to one another and independent of the second cylindrical mounting body and of the cylindrical friction body,
- the further second cylindrical mounting body being mounted on the first cylindrical mounting body of the primary sealing barrier, and
- the contact lips of the second seal being supported by the second cylindrical support body in frictional contact with the cylindrical friction body.

7. The sealing assembly of claim 5, wherein the first cylindrical support body of the primary sealing barrier and the cylindrical friction body of the secondary sealing barrier define a labyrinth seal between them, the labyrinth seal is arranged along the ingress path (P).

8. The sealing assembly of claim 6, wherein the first cylindrical support body of the primary sealing barrier and the cylindrical friction body of the secondary sealing barrier define a labyrinth seal between them, the labyrinth seal is arranged along the ingress path (P).

9. The sealing assembly of claim 7, wherein the first seal of the primary sealing barrier comprises an annular profile made of the same material as the contact lips and arranged axially adjacent to the annular flanged body of the second shield of the secondary sealing barrier.

10. The sealing assembly of claim 8, wherein the first seal of the primary sealing barrier comprises an annular profile made of the same material as the contact lips and arranged axially adjacent to the annular flanged body of the second shield of the secondary sealing barrier.

* * * * *